Dec. 5, 1939.  W. J. BAKER ET AL  2,181,859
VULCANIZING MACHINE
Filed Sept. 3, 1937

Inventors
WALTER J. BAKER
CECIL J. H. PERRY
by Kenway & Witter
Attorneys

Patented Dec. 5, 1939

2,181,859

UNITED STATES PATENT OFFICE 2,181,859

VULCANIZING MACHINE

Walter J. Baker, West Somerville, and Cecil J. H. Perry, North Quincy, Mass., assignors to Boston Woven Hose & Rubber Company, Cambridge, Mass., a corporation of Massachusetts Application September 3, 1937, Serial No. 162,270

10 Claims. (Cl. 18—6)

This invention relates to vulcanizing machines of the continuous vulcanizing type and employing a vulcanizing drum with which cooperates an endless tension band, the material to be vulcanized being continuously passed through the machine between and in pressure contact with the tension band and the arcuate surface of the drum. The drum is heated to vulcanizing temperature as is also the band, the latter being heated by heating jackets held in surface contact therewith. The invention herein relates primarily to the heating jackets and the primary object thereof is to provide a heating jacket having superior features of construction and operation.

Our improved jacket is preferably of segmental construction and each segment has an arcuate surface located adjacent to and cooperating with the tension band where it engages the drum. Each segment is furthermore mounted for movement, preferably in guideways, toward and from the drum under the action of power operated means engaging each segment intermediate of its side edges and in a manner permitting the segments automatically to seat into full surface contact with the band. In accordance with another feature of the invention, power means under a unitary control and connections from the power means to the segments are provided for operating the segments simultaneously to press their arcuate surfaces into contact with that portion of the band which opposes the drum.

More specifically, the invention employs one or more power units and mechanical connections therefrom to the segments and operative to move the segments inwardly to contact the band with the desired pressure and to withdraw the segments therefrom. In the form of the invention illustrated, these connections include a shaft for each segment and linkage therefrom to the segments, the power means having operative connection with all the shafts, and guides acting in conjunction with the linkage serve to maintain the segments in proper relative position about the drum.

Figure 1:
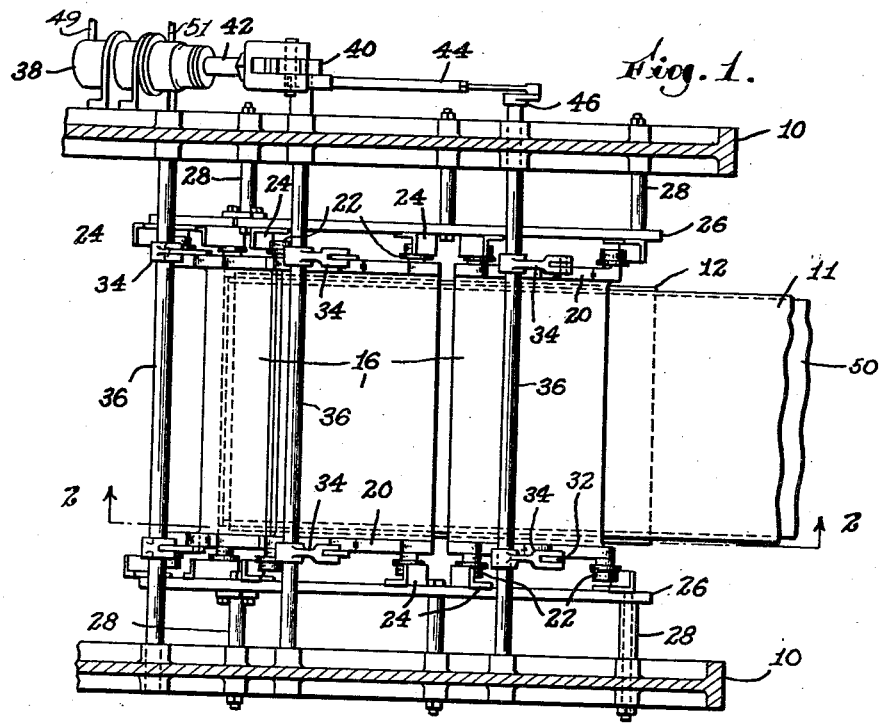

These and other features of the invention will be best understood and appreciated from the following description of a preferred embodiment thereof, selected for purposes of illustration and shown in the accompanying drawing in which, Fig. 1 is a fragmentary plan view of a machine embodying our invention.

Figure 2:
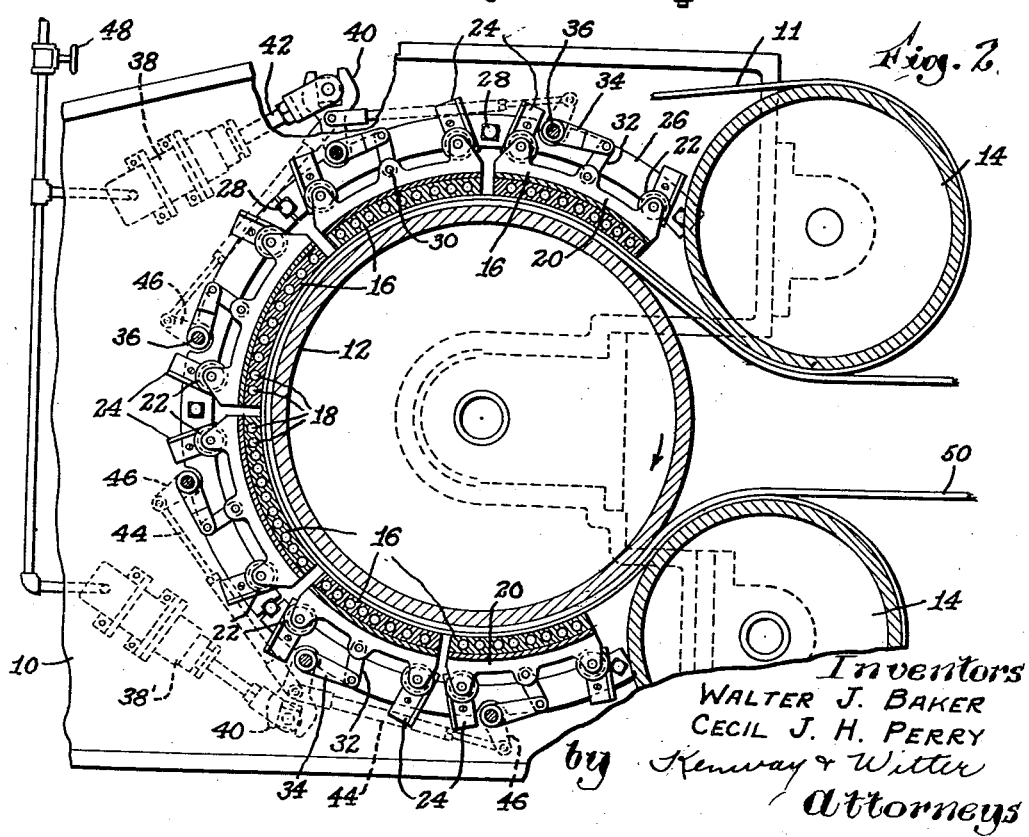

Fig. 2 is a sectional view taken on line 2—2 of Fig. 1.

The heavy metal frame of the machine comprises side members 10 of similar shape rigidly connected and supported on a concrete foundation. The frame is designed to support three rolls over which passes a relatively wide steel tension band 11 in a generally triangular path with a re-entrant loop extending about the periphery of a large vulcanizing drum or cylinder 12 supported by the frame within the general outline of the path of the band. Two of the band-supporting rolls are located adjacent to and forwardly of the vulcanizing drum at 14, and a third roll is located rearwardly of the drum, the tension band being supported on these rolls and engaging the drum. The band is brought to and held in the desired tension by hydraulic pressure in the manner illustrated in Patent 2,039,271. The drum is rotated slowly in the direction indicated by the arrow and the strips to be vulcanized are fed into the bite formed between the band and the drum as the band leaves the lower roll 14.

The vulcanizing drum 12 is steam heated to vulcanizing temperature as shown in said patent. That portion of the band which cooperates with the drum is engaged and heated by a plurality of segments 16 forming a heating jacket, steam coils 18 within the segments providing the heat thereto. Each end of each segment 16 is flanged at 20 and two rollers 22 carried by each such end adjacent to the side edges of the segment are arranged to ride in a radial guideway formed by and between two angle plates 24 secured to an arcuate flange or plate 26 bolted at 28 to a side member 10. The two arcuate flanges are spaced outwardly from the drum, are respectively mounted on the two side members 10 and are concentric with the drum. The several segments are located in relatively close relation whereby providing a segmental jacket extending substantially 270° around the drum and each segment is mounted for movement radially toward and from the drum in its guideways 24.

It is desirable that the jacket segments shall have their arcuate surfaces pressed fully and uniformly into contact with the band and with a firm contact without causing undue friction. It is also desirable that the segments shall be operated simultaneously and from a unitary control. While any suitable power means can be used for this purpose we prefer to employ fluid operated mechanism and so construct such mechanism that one unit thereof with mechanical connections serves to operate a plurality of segments simultaneously.

As illustrated, six segments 16 are arranged about the band covered portion of the drum. Pivotally connected to each end of each segment at 30 on an axis extending along the drum intermediate of the side edges of the segment is a link 32. Each pair of such links is carried by a pair of arms 34 fixed to a shaft 36 mounted to rotate in the side members 10. It will be apparent that clockwise rotation of these shafts (Fig. 2) will act to press the segments onto the band. The upper three segments are fluid operated from a piston within a cylinder 38 and the lower three segments are operated in like manner from a cylinder 38'.

The middle shaft 36 has an arm 40 affixed to one end thereof and the free end of this arm is connected to the piston rod 42 of cylinder 38 whereby outward movement of the rod rotates this shaft clockwise. The two adjacent shafts 36 are connected to the arm 40 by links 44 and arms 46 affixed to such shafts whereby hydraulic pressure within the outer end of the cylinder 38 causes clockwise rotation of the shafts 36 and inward movement of the corresponding segments. As illustrated in Fig. 2, forward movement of all segments is placed under a single control by placing both cylinders 38 and 38' under the control of a single valve 48. This valve 48 is illustrated as controlling the admission of pressure through pipes 49 into the outer ends of the cylinders but any suitable valve arrangement may be provided for controlling this pressure and the pressure through pipes 51 into the inner ends of the cylinders.

The strip material 50 to be vulcanized is fed into, through and from the machine in the direction indicated by the arrow in Fig. 2, and the band 11 is held under constant tension placing the strip under heavy pressure between opposing surfaces of the band and drum as vulcanizing of the strip progresses. These surfaces are heated to vulcanizing temperature and it will be apparent from Fig. 2 that the segments are pressed simultaneously and uniformly into contact with the band during the vulcanizing treatment. It will furthermore be noted that the guides 24 hold the segments in proper relative position and permit movement thereof toward and from the drum while the application of pressure to the segments by the links 32 permits each segment to pivot around the axis 30 and thereby engage its surface in full and even contact with the band. The inner surface of each segment corresponds in curvature to the curvature of the band on the drum and the power means acting on the segments along the axes 30 serves to provide a full and uniform heating contact of the segments with the band. It will be apparent that the mounting of the jackets for radial movement permits the vulcanizing of belts of varying thickness and the maintaining of the jackets in direct contact with the band 11 permits heating of the band by direct contact of the jackets therewith. Thus heating the band makes it possible to keep the band and drum surfaces approximately at the same vulcanizing temperatures with maximum economy and results in producing a superior and uniformly vulcanized product. It should furthermore be mentioned that our invention has particular application to machines for vulcanizing endless belting, as shown in Patent No. 2,110,076 to J. M. Bierer. In the vulcanizing of belting having two free ends, one end is initially fed into the machine and the belting is fed from the machine in like manner at the completion of the vulcanizing operation. Endless belting however must be placed on the vulcanizing drum over one end thereof and such action requires a spacing of the tension band from the drum sufficiently to permit the application and removal of the belting. The heating jacket must also be withdrawn from the band and drum when such belting is to be applied to or removed from the drum, and the power operated arrangement herein disclosed renders such withdrawing of the heating jacket for this purpose a relatively simple and easy matter.

Having thus described our invention, what we claim as new and desire to secure by Letters Patent of the United States is,

1. A continuous vulcanizing machine, comprising a frame, a vulcanizing drum thereon, an endless band having an open loop portion passing around a substantial arcuate portion of the drum, a heating jacket having a concave arcuate surface located adjacent to and adapted to have direct and continuous surface contact with said loop portion of the band, means for heating said concave surface, jacket guiding means fixed to the frame for guiding the jacket for movement toward and from the drum, and means pivotally engaging the jacket at an axis extending along the drum intermediate the side edges of the jacket and outwardly of said loop portion of the band for forcing the jacket inwardly to press its said arcuate surface into surface contact with the band, the jacket being pivotably movable about said axis.

2. A continuous vulcanizing machine, comprising a vulcanizing drum, an endless band having an open loop portion passing around a substantial arcuate portion of the drum, a heating jacket comprising a plurality of independent segments having concave arcuate surfaces located adjacent to and adapted to have direct and continuous surface contact with said loop portion of the band, means for heating the concave surfaces, and means engaging each segment at an axis extending along the drum intermediate the side edges of the segment for forcing the segments inwardly to press their said arcuate surfaces into surface contact with the band, the second named means including unitary power means common to said segments for simultaneously performing said forcing action thereon and each segment being pivotably movable about its said axis.

3. The machine defined in claim 2 wherein the second-named means includes a shaft adjacent to each segment, and means including arms carried by each shaft connecting the shaft to its segment at said axis, the unitary power means being connected to the shafts and operable to perform said forcing action on the segments simultaneously.

4. A continuous vulcanizing machine, comprising a vulcanizing drum, an endless band having an open loop portion passing around a substantial arcuate portion of the drum, a heating jacket having an arcuate surface located adjacent to and cooperating with said loop portion of the band, means for heating the jacket, relatively spaced members providing a radial guideway at each end of the jacket, means supporting the jacket for movement along the guideways, and means engaging the ends of the jacket intermediate of said members for forcing the jacket inwardly to press its said arcuate surface against the band.

5. A continuous vulcanizing machine, comprising a vulcinizing drum, an endless band having an open loop portion passing around a substantial arcuate portion of the drum, a heating jacket comprising a plurality of independent segments having concave arcuate surfaces located adjacent to and adapted to have direct and continuous surface contact with said loop portion of the band, means for heating the concave surfaces, means providing a radial guideway at each end of each segment, means supporting the segments for movement along said guideways, a power unit, means for controlling the operation of such unit, and connections from the power unit to each segment for simultaneously forcing the segments inwardly and pressing their arcuate surfaces into direct and continuous surface contact with the band.

6. A continuous vulcanizing machine, comprising a vulcanizing drum, an endless band having an open loop portion passing around a substantial arcuate portion of the drum, a heating jacket comprising a plurality of independent segments having arcuate surfaces located adjacent to and cooperating with said loop portion of the band, means for heating the segments, a power unit, and means including links connecting the power unit with the segments whereby simultaneously to force the segments inwardly and press their arcuate surfaces into contact with the band.

7. A continuous vulcanizing machine, comprising a vulcanizing drum, an endless band having an open loop portion passing around a substantial arcuate portion of the drum, a heating jacket comprising a plurality of independent segments having arcuate surfaces located adjacent to and cooperating with said loop portion of the band, means for heating the segments, a shaft adjacent to and extending along one segment, power means for rotating the shaft, other shafts respectively adjacent to and extending along other segments, means operatively connecting said other shafts to the power unit, and connections from the shafts to the segments for simultaneously forcing the segments inwardly and pressing their arcuate surfaces into surface contact with the band as the shafts are rotated in one direction.

8. A continuous vulcanizing machine, comprising a drum having a cylindrical vulcanizing surface, an endless pressure band having an open loop portion passing around a substantial arcuate portion of the drum adjacent to said surface, a heating jacket comprising a plurality of independent segments having concave arcuate surfaces located adjacent to and adapted to have direct and continuous surface contact with said loop portion of the band, means for heating the concave surfaces, a motor, and rotary mechanical connections from the motor to the segments for moving the segments simultaneously into contact with the band and withdrawing them therefrom.

9. A continuous vulcanizing machine comprising a vulcanizing drum having a cylindrical vulcanizing surface, an endless pressure band having an open loop portion passing around a substantial arcuate portion of the drum adjacent to said surface, a heating jacket comprising a plurality of independent segments having concave surfaces located adjacent to and adapted to have direct and continuous surface contact with said loop portion of the band, means for heating the concave surfaces, a power driven reversing means, and mechanical connections from said reversing means to each of said segments, operation of said power driven means in one direction serving to operate said mechanical connections to move the segments inwardly to press their arcuate surfaces into direct and continuous surface contact with the band, and operation of said reversing means in the other direction serving to operate said mechanical connections to withdraw the segments from the band.

10. A continuous vulcanizing machine, comprising a vulcanizing drum, an endless band having an open loop portion passing around a substantial arcuate portion of the drum, a heating jacket comprising a plurality of independent segments having arcuate surfaces located adjacent to and cooperating with said loop portion of the band, means for heating the segments, a fluid operated power unit, means including a shaft connected to and operated by the power unit, and auxiliary means connecting the segments to the second-named means for simultaneously forcing the segments inwardly and pressing their arcuate surfaces into surface contact with the band.

WALTER J. BAKER.
CECIL J. H. PERRY.